G. B. C. FOSTER.
COTTON CHOPPER.
APPLICATION FILED NOV. 6, 1912.
1,061,233.
Patented May 6, 1913.
3 SHEETS—SHEET 1.
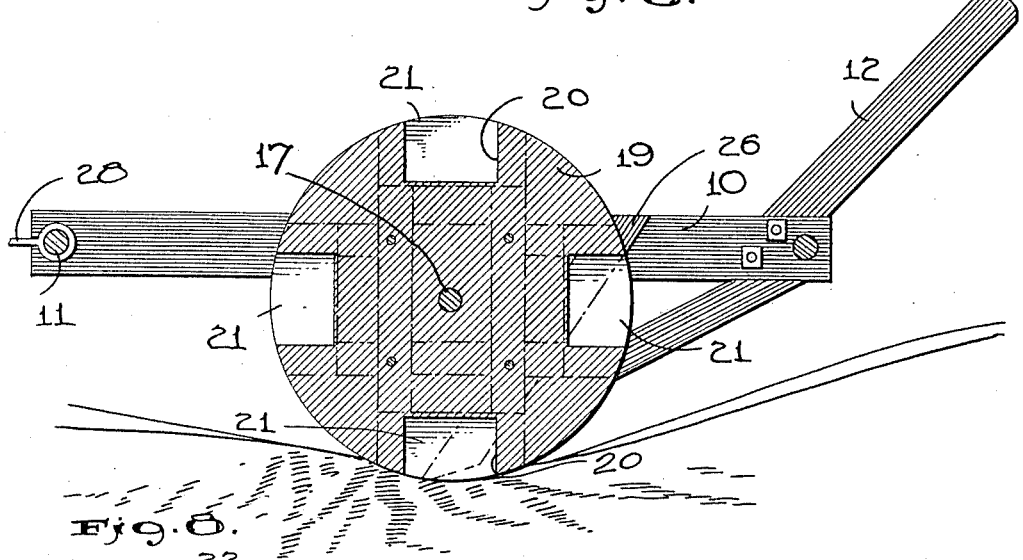
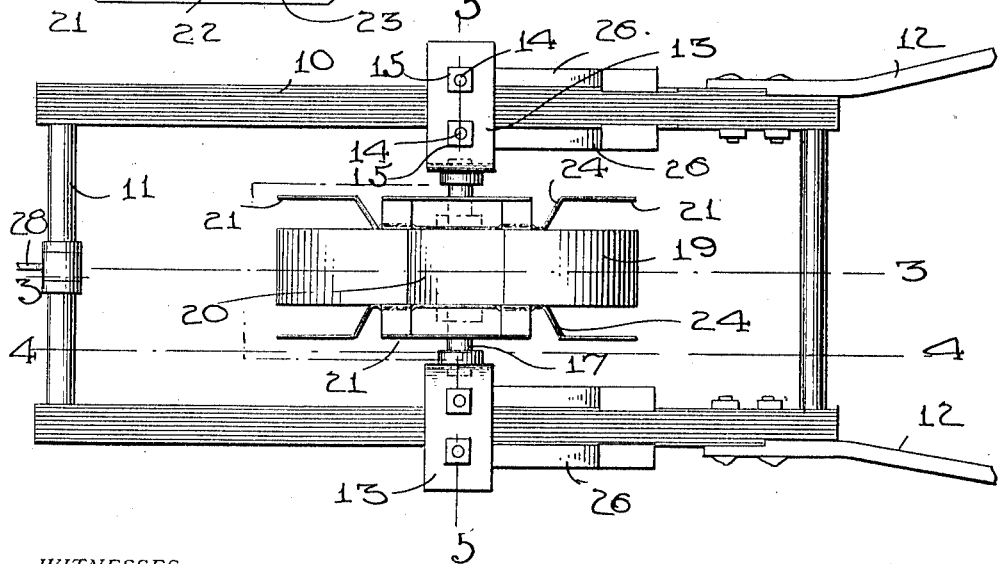
WITNESSES
INVENTOR
Green B. C. Foster
his Attorney

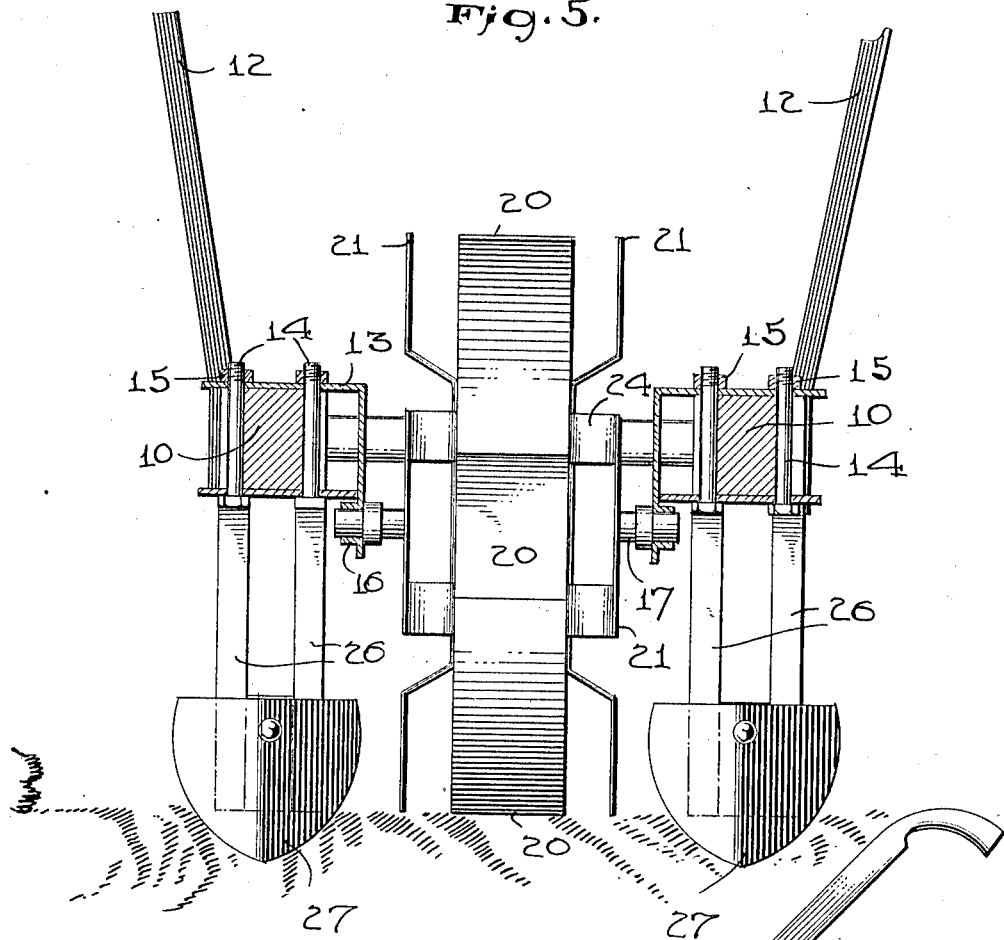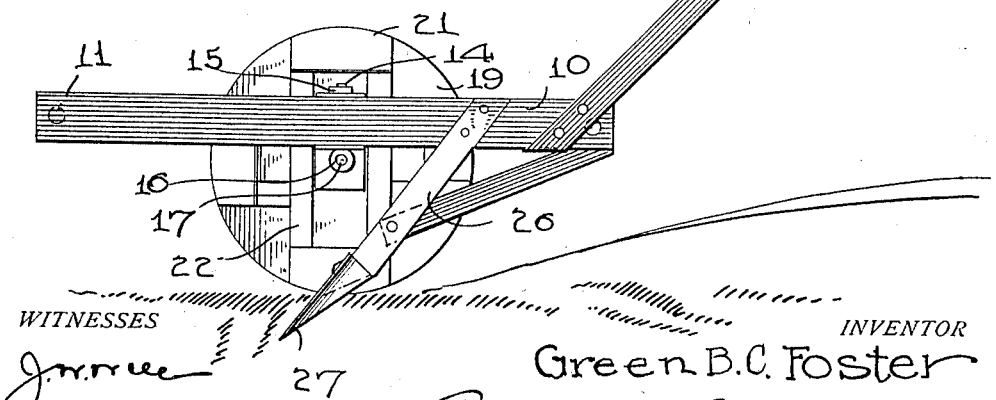

G. B. C. FOSTER.
COTTON CHOPPER.
APPLICATION FILED NOV. 6, 1912.

1,061,233.

Patented May 6, 1913.
3 SHEETS—SHEET 3.

WITNESSES

INVENTOR
Green B.C. Foster
By E.E. Vrooman, his Attorney

UNITED STATES PATENT OFFICE.

GREEN BERRY CLAY FOSTER, OF MILLTOWN, ALABAMA.

COTTON-CHOPPER.

1,061,233.  Specification of Letters Patent.  Patented May 6, 1913.

Application filed November 6, 1912. Serial No. 729,848.

*To all whom it may concern:*

Be it known that I, GREEN BERRY CLAY FOSTER, a citizen of the United States of America, residing at Milltown, in the county of Chambers and State of Alabama, have invented certain new and useful Improvements in Cotton-Choppers, of which the following is a specification, reference being had therein to the accompanying drawing.

This invention relates to agricultural implements and has special reference to an improved cotton chopper.

The principal object of the invention is to improve and simplify the general construction of devices of this character.

A second object of the invention is to provide an improved construction of blade-carrying wheel or disk.

The third object of the invention is to provide an improved blade struck from a single piece of sheet metal.

With the above and other objects in view, as will be hereinafter outlined, the invention consists in general of certain novel details of construction, combination of parts hereinafter fully described, illustrated in the accompanying drawings, and specifically claimed.

Figure 6:
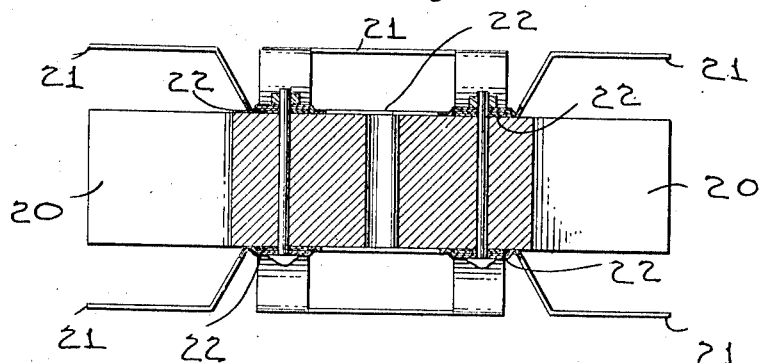
Figure 4:
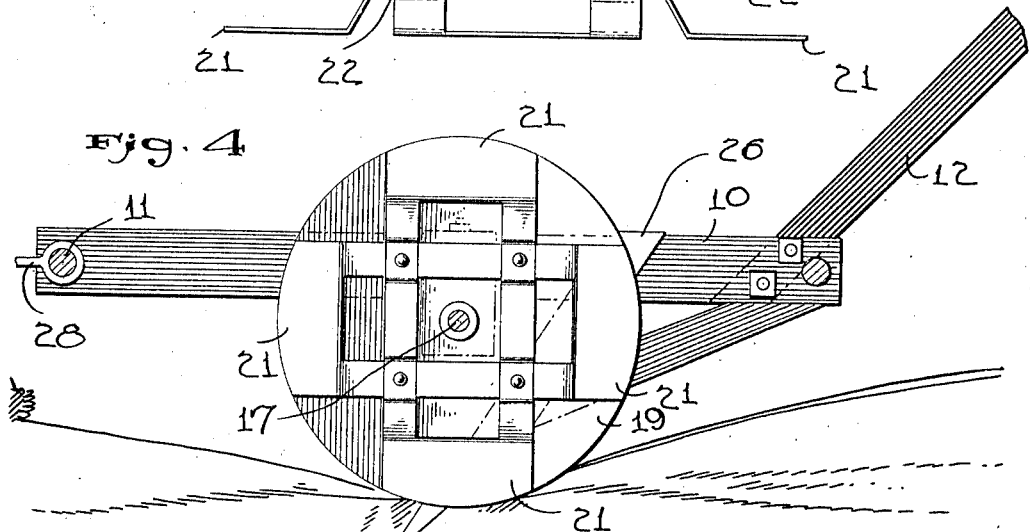
Figure 7:
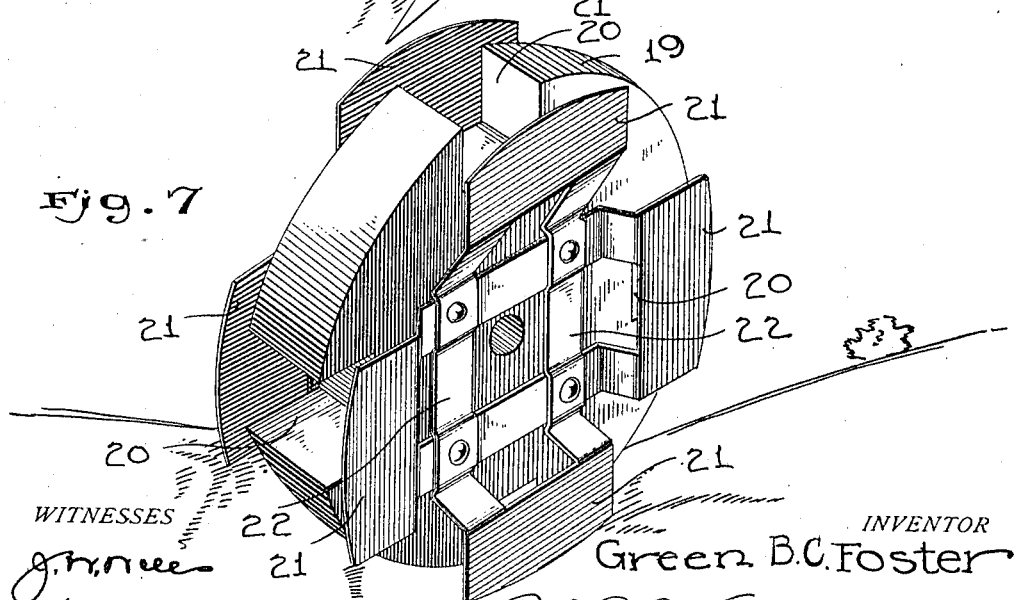

In the accompanying drawings, like characters of reference indicate like parts in the several views, and Figure 1 is a plan of the chopper constructed in accordance with this invention. Fig. 2 is a side elevation thereof. Fig. 3 is a section on the line 3—3, of Fig. 1. Fig. 4 is a section on the line 4—4, of Fig. 1. Fig. 5 is an enlarged section on the line 5—5, of Fig. 1. Fig. 6 is a section taken diametrically through the disk and blades of the chopper. Fig. 7 is a detail perspective of the disk and blades. Fig. 8 is a detail of a blank used in forming one pair of the blades.

In the embodiment of the invention here shown, there is provided a frame consisting of side members 10 which are connected at their front and rear ends by transverse members 11. To the rear of the side members 10 are bolted handles 12 of the ordinary kind. Intermediate the ends of each side member, there is provided a bracket 13 which is of U-shape, and which has its legs extending over the top and bottom of the respective side member, the bracket being held in position by suitable bolts 14 and nuts 15.

Depending from the bight of each bracket is a bearing 16 and in these bearings is mounted a shaft 17 which carries a wheel 19 provided with a series of peripheral slots or pockets 20. This wheel forms a ground wheel for the chopper. To each side of this wheel are secured the chopper blades. These blades are arranged in pairs at right angles to each other on each side of the wheel, and each pair of these blades is formed from a blank consisting of an oblong strip of metal having rounded cutting ends 21 connected together by side strips 22, the center of the blank being cut longitudinally and transversely with the transverse cuts intersecting the ends of the longitudinal cuts. The parts thus separated from the remainder of the blank along three of the edges are defined further from the blank by fold lines 23 along which they are folded back to reinforce the side strips 22. This blank is of greater length than the diameter of the wheel so that the ends may be bent upward and then parallel to the center part, as indicated at 24, thus bringing the cutting edges opposite the notches in the periphery of the wheel.

The implement is furthermore provided with standards 26 carrying shovels 27 and at the forward ends the cross or transverse member 11 is provided with suitable means, indicated generally at 28, for the attachment of one or more draft animals.

This implement is used to chop the cotton after the plants have been spaced by the use of a chopper having a blade moving across the row, the blades of this implement moving along the sides of the row and cutting off the plants which may have extended outside of the regular row. It will be observed that the young plants left after the first chopping are prevented from injury by the provision of the pockets 20 into which they move as the wheel moves along the row.

There has thus been provided a simple and efficient device of the kind described and for the purpose specified.

Having thus described my invention, what is claimed as new is:—

1. In a chopper of the class described, a disk provided with a series of peripheral pockets, and a series of chopper blades having their cutting edges spaced from the sides of the disk and parallel thereto.

2. In a chopper of the class described, a disk provided with a series of peripheral pockets, a plurality of pairs of chopper blades secured to the sides of said disk and having their cutting edges spaced from the sides of the disk and parallel thereto, said blades being made in pairs from a single blank of sheet metal bent to permit its center portion to rest against the respective side of the disk and be secured thereto, and having its ends in said spaced relation.

3. In a cotton chopper, a pair of blades made from a single blank of sheet metal having parallel sides and curved sharpened ends, the central portion of the blank being slitted longitudinally and transversely with the transverse slits intersecting the ends of the longitudinal slit, said blank having the partially separated portions folded outward to reinforce the sides and being bent upward and then parallel at the ends to bring the cutting edges formed by the sharpened ends in spaced parallel relation with the center.

In testimony whereof I hereunto affix my signature in presence of two witnesses.

GREEN BERRY CLAY FOSTER.

Witnesses:
W. M. PEARSON,
H. C. WILLIAMS.

Copies of this patent may be obtained for five cents each, by addressing the "Commissioner of Patents, Washington, D. C."